(12) United States Patent
Kurita et al.

(10) Patent No.: US 6,838,850 B2
(45) Date of Patent: Jan. 4, 2005

(54) METHOD FOR CONTROLLING MOTORIZED STORING DOOR MIRROR

(75) Inventors: Takahiro Kurita, Shizuoka (JP); Mitsuyoshi Nagao, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 125 days.

(21) Appl. No.: 10/220,297

(22) PCT Filed: Jan. 11, 2002

(86) PCT No.: PCT/JP02/00131

§ 371 (c)(1),
(2), (4) Date: Sep. 12, 2002

(87) PCT Pub. No.: WO02/096709

PCT Pub. Date: Dec. 5, 2002

(65) Prior Publication Data

US 2003/0107340 A1 Jun. 12, 2003

(30) Foreign Application Priority Data

May 25, 2001 (JP) ........................ 2001-156458

(51) Int. Cl.[7] ............................... G05B 5/00
(52) U.S. Cl. ................ 318/469; 318/466; 318/471; 318/468; 318/266; 318/286
(58) Field of Search ................ 318/469, 434, 318/436, 472, 641, 280, 474, 266, 286, 466–471

(56) References Cited

U.S. PATENT DOCUMENTS

| | | | | |
|---|---|---|---|---|
| 3,636,426 A | * | 1/1972 | Buiting | 318/471 |
| 4,161,681 A | * | 7/1979 | Rathje | 318/783 |
| 4,408,244 A | * | 10/1983 | Weible | 361/24 |
| 4,910,445 A | * | 3/1990 | Borrmann | 318/468 |
| 5,229,695 A | * | 7/1993 | Tsuda et al. | 318/434 |
| 5,315,442 A | * | 5/1994 | Sato et al. | 359/877 |
| 5,585,702 A | * | 12/1996 | Jackson et al. | 318/266 |
| 5,596,253 A | * | 1/1997 | Mizuta et al. | 318/469 |
| 5,708,336 A | * | 1/1998 | Eyerly et al. | 318/436 |
| 5,712,548 A | * | 1/1998 | Tice et al. | 318/293 |
| 5,793,171 A | * | 8/1998 | Hayashi et al. | 318/434 |
| 6,023,107 A | * | 2/2000 | Grass | 307/10.1 |
| 6,078,160 A | * | 6/2000 | Cilluffo | 318/641 |
| 6,768,621 B2 | * | 7/2004 | Arnet et al. | 361/93.1 |

FOREIGN PATENT DOCUMENTS

| | | |
|---|---|---|
| JP | 37044/1992 | 3/1992 |
| JP | 8-207663 | 8/1996 |
| JP | 9-107691 | 4/1997 |
| JP | 11-122961 | 4/1999 |
| JP | 11-206164 | 7/1999 |

OTHER PUBLICATIONS

Patent Abstracts of Japan, JP 04–178184, Jun. 25, 1992.
Patent Abstracts of Japan, JP 07–195980, Aug. 1, 1995.
Patent Abstracts of Japan, JP 10–035362, Feb. 10, 1998.

* cited by examiner

*Primary Examiner*—David Martin
*Assistant Examiner*—Renata McCloud
(74) *Attorney, Agent, or Firm*—Oblon, Spivak, McClelland, Maier & Neustadt, P.C.

(57) ABSTRACT

A control unit for an electrically retractable door mirror includes a motor to drive rotationally a door mirror to a stored position or a normal position, a change-over switch, and first and second control circuits. The first and second control circuits include electronic switches respectively that are capable of switching on/off depending on the polarity of an electrical signal switched by the change-over switch. Excess current detecting devices, whose electrical resistances grow with an increase in a current, are connected to the electronic switches in series respectively. And, shutoff switches switch off the electronic switches respectively when a voltage generated in the excess current detecting devices exceeds a predetermined value.

5 Claims, 5 Drawing Sheets

US 6,838,850 B2

METHOD FOR CONTROLLING MOTORIZED STORING DOOR MIRROR

FIELD OF THE INVENTION

The present invention relates to control of an electrically retractable door mirror and particularly to the technique to shut off the current supplied to a motor reliably when an excess current flows into it.

BACKGROUND OF THE INVENTION

It frequently occurs that a door mirror projecting from the side of a vehicle for monitoring the rear view makes an obstruction when it passes through a narrow street or is put into a garage. An electrically retractable door mirror has been brought into wide use recently, which has switch-selectable normal and stored positions. The stored position refers to a door mirror retracted position; on the other hand the normal position refers to a door mirror use position.

An electrically retractable door mirror, which is advantageous in terms of handling, allows a driver to retract the mirror by switching when it may possibly make an obstruction on such an occasion as garaging and return it to the normal position by another switching.

Japan Laid-Open Patent 08-207663 (hereinafter referred to as the prior art) discloses a conventional control unit for an electrically retractable door mirror. FIG. 5 is shows the circuit described in the prior art, which will be explained referring to the figure.

As shown in FIG. 5, the control circuit of the electrically retractable door mirror of the prior art includes, a DC (direct current) motor M for driving, a pair of power input terminals 1 and 2, a bipolar electrolytic capacitor C1, resistors R1–R6, motor drive FETs (field effect transistors) T1 and T2 and PNP (positive-negative-positive) transistors T3 and T4. The layout of the control circuit is symmetrical vertically relative to the bipolar electrolytic capacitor C1. Of the resistors R1–R6, R1 and R2 are the base resistors of the transistors T3 and T4, R3 and R4 are the excessive current detecting resistors which detect the excessive current and turn on the PNP transistors T3 and T4, and R5 and R6 are the gate resistors of the motor drive FETs T1 and T2, respectively.

When a driver selects "retract", a positive voltage is imposed on the power input terminal 1 and a zero voltage on the power input terminal 2, respectively. A charging current thus flows into the bipolar electrolytic capacitor C1 through the gate resistors R5 and R6. The voltage of the gate G of the motor drive FET T1 is lower than that of the source S and thereby this motor drive FET T1 is turned on, since the current flows downward through the gate resistor R5 on FIG. 5. The current flows through the path—power input terminal 1→motor drive FET T1→excess current detecting resistor R3→DC motor M→excess current detecting resistor R4→motor drive FET T2→power input terminal 2 and thereby the DC motor M rotates in the positive direction to retract the mirror. When the voltage imposed on the power input terminals is reversed, the DC motor will rotate in the opposite direction to reset the mirror into the normal position.

An excess current called lock current flows into the DC motor M if the retraction movement reaches the stroke end or is blocked under some circumstances. A large voltage drop occurs at the excess current detecting resistor R3. If the voltage across the excess current detecting resistor R3 exceeds the ON-state voltage between the base and the emitter of the PNP transistor T3, it will be turned on. Subsequently, the gate resistor R5 is shorted and the motor drive FET T1 is turned off to shut off the current, and thereby the DC motor M comes to a stop. The possible burnout will thus be prevented since the current is shut off by the instantaneous detection of the excess current of the DC motor M.

However, the control circuit described above is likely to present difficulty in determining the resistance of the excess current detecting resistor, when the difference between the operating current and the lock current is not sufficiently large. There is the fear that the DC motor M comes to a stop in the middle of operation due to a false detection while it is operating normally or the lock current is not detected even though it actually flows into the DC motor M.

Since the semiconductors susceptible to the surge are used for the switches SWs shutting off the current flowing into the DC motor M, the alternative high voltage resistance elements or two pieces of the protection elements are required so that these semiconductors may be protected against the outside surge or the surge generated by the DC motor M. It will be followed by the cost increase in production.

The object of the present invention to assess the technical problems described above is to provide a control unit for an electrically retractable door mirror, which is capable of detecting the excess current securely and shutting off the current supplied to the motor when the excess current flows into the motor.

SUMMARY OF THE INVENTION

The first aspect of the present invention to assess the problems described above provides a control unit for an electrically retractable door mirror, including: a motor to drive rotationally a door mirror to a stored position or a normal position; a pair of a first and second power input terminals; a change-over switch which supplies a direct current voltage to the motor by switching a polarity of a direct current power source mounted on a vehicle; and a first and second control circuits, each of the control circuits has a first terminal connected to the first power input terminal, a second terminal connected to the second power input terminal and a third terminal connected to a motor terminal, wherein each of the first and second control circuits includes, an electronic switch which is disposed between the change-over switch and the motor and capable of switching on/off depending on the polarity of an electrical signal switched by the change-over switch, an excess current detecting means whose electrical resistance grows with an increase in a current and which is connected to the electronic switch in series, and a shutoff switch which switches off the electronic switch when a voltage generated in the excess current detecting means exceeds a predetermined value.

The invention enables the reliable detection of the excess current and the instantaneous shutoff of the current supplied to the motor.

The second aspect of the present invention provides a control unit in which the first and second excess current detecting means include positive temperature coefficient (PTC) elements. The invention allows the easier determination of the circuit even if the difference between the motor operating current and the lock current is not sufficiently large.

The third aspect of the present invention provides a control unit in which a timer that switches off the electronic switch in a predetermined time after the change-over switch selects the polarity of the direct current voltage supplied to the motor is provided between the first and second power input terminals and the first and second control circuits. The invention enables the shutoff of the current supplied to the motor in a predetermined time even if the lock current can not be detected.

The fourth aspect of the present invention provides a control unit wherein each of the first and second control circuits includes a transistor, a first, second and third resistors and a capacitor, wherein a collector of the transistor is connected to the first power input terminal, an emitter of the transistor is connected to the second power terminal and a base of the transistor is connected to the motor through the first and second resistors and a diode and to the second power terminal through the third resistor, and wherein the capacitor is connected between a junction of the first and second resistors and the second power input terminal. The invention can relax the load imposed on the PTC due to such a cause as a short break of the power source.

The fifth aspect of the present invention provides a control unit wherein a surge absorbing element is provided between a junction of the motor terminal and the first and second control circuits and the second power input terminal. The invention allows the application of semiconductors with low voltage resistance, thereby contributing to the reduction in the production cost.

DESCRIPTION OF THE PREFERRED EMBODIMENTS

The embodiments of the present invention will now be described referring to the accompanying drawings.

Figure 1:
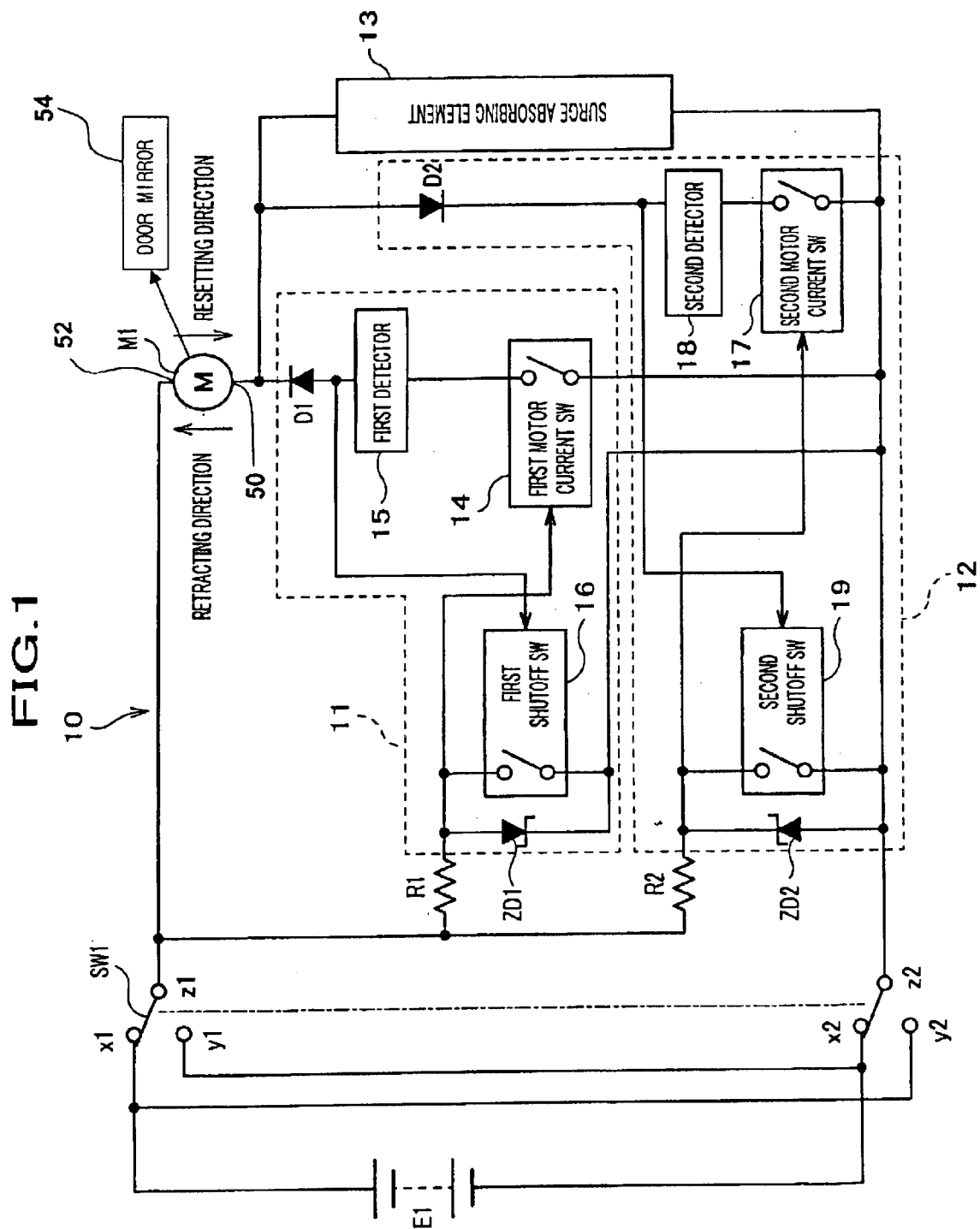
FIG. 1 is a block diagram showing the structure of the control unit for an electrically retractable door mirror according to the first embodiment of the present invention.

FIG. 1 is a block diagram showing the structure of the control unit for an electrically retractable door mirror according to the first embodiment of the present invention. As shown in FIG. 1, a control unit for an electrically retractable door mirror 10 includes, a change-over switch SW1 capable of switching the polarity of the DC voltage supplied by a battery E1 which is mounted on a vehicle, a first control circuit 11 and a second control circuit 12 disposed in the latter stage of the change-over switch SW1 and a surge absorbing element 13. The control unit 10 controls the rotation of a motor M1 for driving rotationally a door mirror 54 mounted on a vehicle into a stored position or a normal position. The motor M has first and second terminals 50 and 52.

The change-over switch SW1 has two switches which are correlated each other in such a manner that the connection of contacts x2 and z2 is synchronized with that of contacts x1 and z1 or the connection of contacts y2 and z2 with that of contacts y1 and z1.

The first control circuit 11 includes a first motor current SW 14 which is turned on receiving an L-level signal when the motor M1 is imposed on the voltage to rotate it in a positive direction to retract a door mirror (the change-over switch SW1 is positioned to the contacts y1 and y2), a first detector 15 including resistance elements such as a resistor or PTC, a first shutoff SW 16, which is activated by the increased voltage across the first detector 15, turning off the first motor current SW 14, a diode D1 for cutting off the current during resetting, a zener diode ZD1 which stabilizes the voltage and protects the semiconductors from surge.

The second control circuit 12 includes a second motor current SW 17 which is turned on receiving an H-level signal when the motor M1 is imposed on the voltage to rotate it reversely (in the opposite direction described above) to reset a door mirror (the change-over switch SW1 is positioned to the contacts x1 and x2), a second detector 18 including resistance elements such as a resistor or PTC, a second shutoff SW 19, which is activated by the increased voltage across the second detector 18, turning off the second motor current SW 17, a diode D2 for cutting off the current during retracting, a zener diode ZD2 which stabilizes the voltage and protects the semiconductors from surge.

Figure 2:
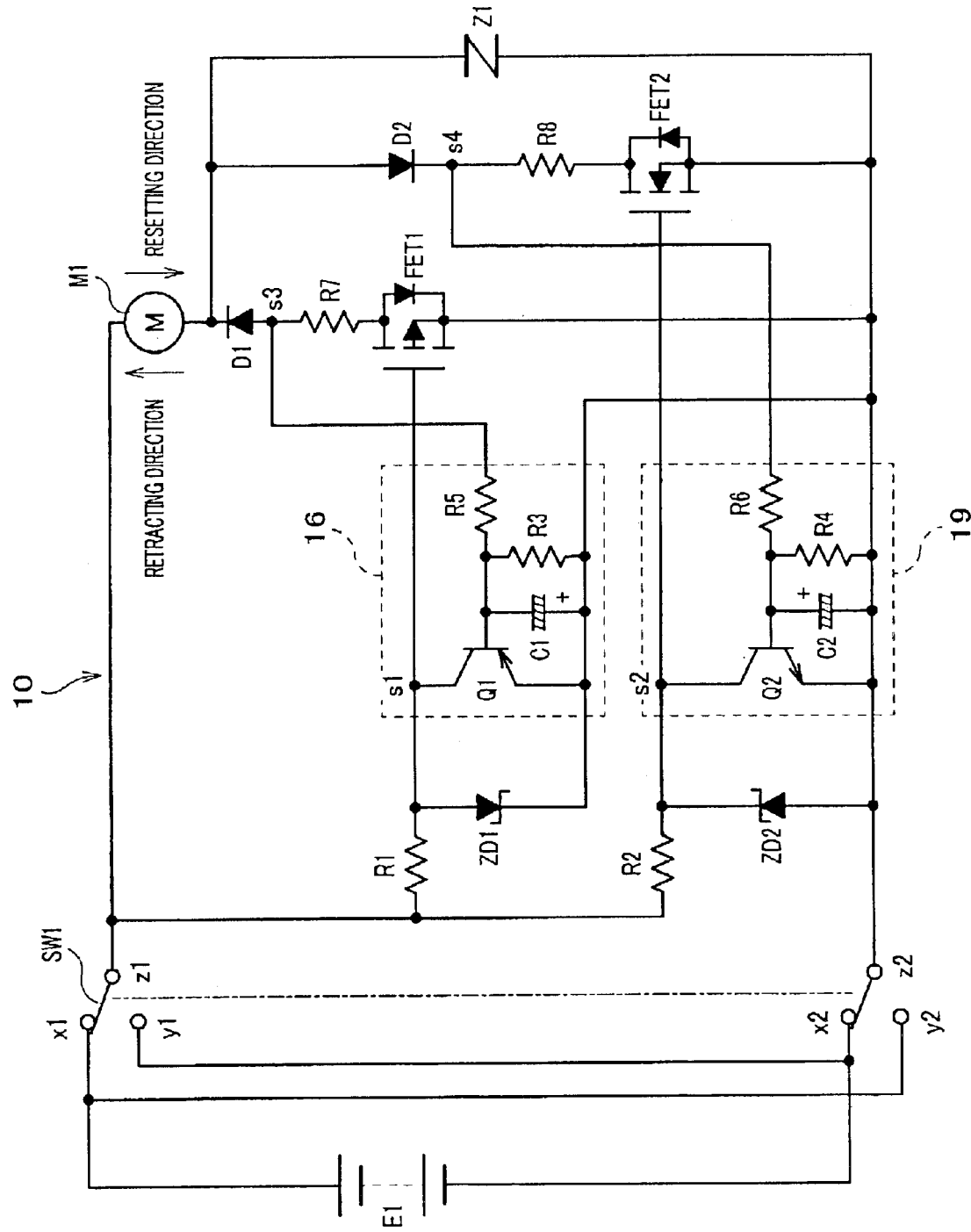
FIG. 2 is a circuit diagram showing the control unit for an electrically retractable door mirror shown in FIG. 1.

FIG. 2 is a circuit diagram showing the control unit for an electrically retractable door mirror 10 shown in FIG. 1. As shown in FIG. 2, an FET1 is used for the first motor current SW 14 and a resistor R7 for the first detector 15. The first shutoff SW 16 includes a PNP transistor Q1, a capacitor C1 for absorbing the motor noise, and resistors R3 and R5. The collector of the transistor Q1 is connected to the gate of the FET1 through a junction s1, the emitter to the contact z2 of the change-over switch SW1 and the base to the junction s3 of the diode D1 and the resistor R7 through the resistor R5. The capacitor C1 and the resistor R3 are connected between the base of the transistor Q1 and the contact z2 of the change-over switch SW1.

Similarly, an FET2 is used for the second motor current SW 17 and a resistor R8 for the second detector 18. The second shutoff SW 19 includes a NPN transistor Q2, a capacitor C2 for absorbing the motor noise, and resistors R4 and R6. The collector of the transistor Q2 is connected to the gate of the FET2 through a junction s2, the emitter to the contact z2 of the change-over switch SW1 and the base to the junction s4 of the diode D2 and the resistor R8 through the resistor R6. The capacitor C2 and the resistor R4 are connected between the base of the transistor Q2 and the contact z2 of the change-over switch SW1.

A surge absorber Z1 is employed for the surge absorbing element 13.

The operation of the control unit according to the present embodiment will be described below, assuming that the door mirror is reset to the normal position from the stored position (the door mirror is retracted). The change-over switch SW1 is accordingly switched, so that the connection is established between the contacts x1 and z1, and x2 and z2.

Then the FET T2 is turned on since the source voltage of the battery E1 is imposed on the gate of the FET T2.

The current flows through the loop—battery E1, contact x1, contact z1, motor M1, diode D2, resistor R8, FET2, contact z2 and contact x2, thereby driving rotationally the motor M1 in the resetting direction. The door mirror (not shown) thus returns to the normal position rotationally.

When the door mirror reaches the normal position and the rotation of the motor M1 is forcefully terminated, the voltage at the junction s4 increases due to the lock current of the control unit 10. Since this voltage is divided by the resistors R4 and R6 and imposed on the base and emitter of the transistor Q2, the continuity between the collector and emitter of the transistor Q2 is established to turn off the FET2 when the divided voltages exceed predetermined levels. The current flowing into the motor M1 is thereby shut off.

When the door mirror in the normal position is retracted, on the other hand, the change-over switch SW1 is selected so that the connection between the contacts y1 and z1, and y2 and z2 is established. Accordingly, the current flows through the motor M1 in the retracting direction shown in FIG. 2, rotating the motor M1 in the retracting direction the same way described above. The current is shut off when the door mirror reaches the stored position.

It is possible to rotate the motor M1 in the normal or reverse direction and shut off the current securely when the door mirror reaches the normal or stored position.

As described above, the control unit 10 according to the present embodiment, in which the first and second motor current SWs 14 and 17 using semiconductors are located down the motor M1, can protect the two semiconductor switches by just connecting a piece of the surge absorbing element 13 (surge absorber Z1). It will allow the use of semiconductors which have lower voltage resistance in the circuit, thereby leading to a cost reduction.

Figure 3:
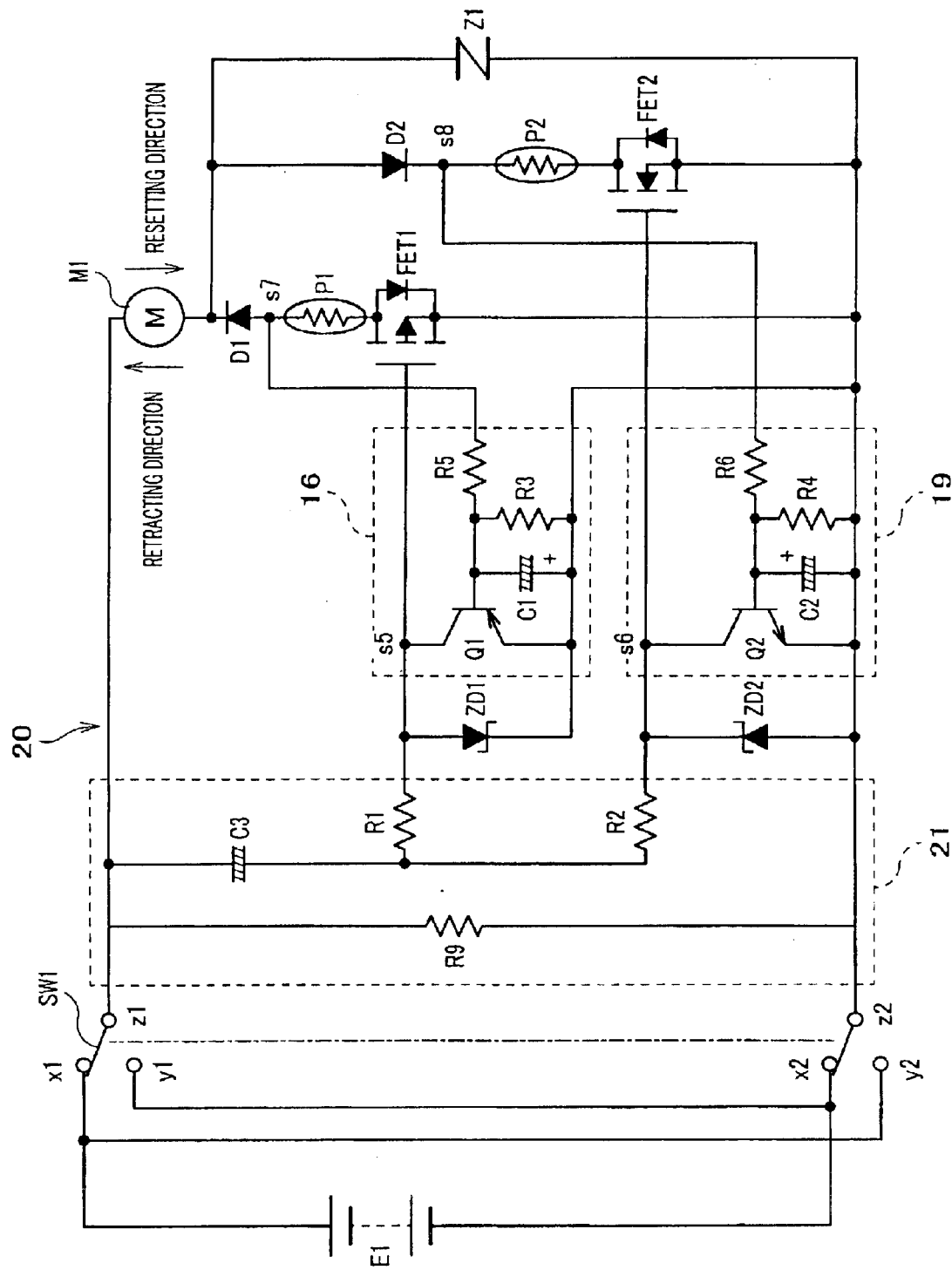
FIG. 3 is a circuit diagram showing the control unit for an electrically retractable door mirror according to the second embodiment of the present invention.

The second embodiment of the present invention will be described with reference to FIG. 3. FIG. 3 is a circuit diagram showing the control unit for an electrically retractable door mirror according to the second embodiment of the present invention. A control unit for an electrically retractable door mirror 20 according to the present embodiment employs PTCs P1 and P2 replacing the resistors R7 and R8 used for the first and second detectors 15 and 17 of the first embodiment. Also it includes a resistor R9 and a capacity C3 to form a timer circuit 21. Taking into account the similarities, further descriptions will be omitted for the items which are the same as those of the first embodiment, bearing the same symbols.

The operation of the present embodiment will be described, assuming that the door mirror is reset to the normal position from the stored position (the door mirror is retracted). The change-over switch SW1 is selected accordingly so that the connection is established between the contacts x1 and z1, and x2 and z2.

Then the source voltage of the battery E1 is imposed on the timer circuit 21 and the FET2 is turned on since the voltage at a junction s6 is rendered H level for the time period controlled by this timer circuit 21.

The current flows through the loop—battery E1, contact x1, contact z1, motor M1, diode D2, PTC element P2, FET2, contact z2 and contact x2, thereby driving rotationally the motor M1 in the resetting direction. The door mirror (not shown) thus returns to the normal position rotationally.

When the door mirror reaches the normal position and the rotation of the motor M1 is forcefully terminated, the voltage at a junction s8 increases depending on the resistance increase of the PTC element P2 due to the lock current of the control unit 20. Since this voltage is divided by the resistors R4 and R6 and imposed on the base and emitter of the transistor Q2, the continuity between the collector and emitter of the transistor Q2 is established to turn off the FET2 when the divided voltages exceed predetermined levels. It will be followed by the shutoff of the current flowing into the motor M1.

In case the current continues to flow into the motor M1 after the elapse of considerable time, which is caused by the malfunction such as the undetected lock current or the PTC or the FET short, it is possible to shutoff the current by turning off the FET2 securely since the voltage at the junction s6 is rendered L level in a predetermined time controlled by the timer circuit 21.

When the door mirror in the normal position is retracted, on the other hand, the change-over switch SW1 is selected so that the connection between the contacts y1 and z1, and y2 and z2 is established. Accordingly, the current flows into the motor M1 in the retracting direction shown in FIG. 2, rotating the motor M1 in the retracting direction the same way described above. The current is shut off when the door mirror reaches the stored position.

It is possible to rotate the motor M1 in the normal or reverse direction and shut off the current securely when the door mirror reaches the normal or stored position.

In this embodiment (descriptions to be made hereinafter are only for resetting operation), the approximate voltage at the junction s8 is expressed as (the resistance of the PTC element P2)×(the motor current).

Suppose the difference between the operating current and the lock current of the motor M1 is small and a typical resistor is used in lieu of the PTC element P2 as shown in the first embodiment, the voltage will be approximately the same between the motor M1 normal operation and the lock current occurrence. It is likely to result in the problem of the prior art that it is difficult to design the resistance of the resistor for detecting the lock current.

However, the voltage at the junction s8 varies significantly when the lock current flows through the motor M1 since the PTC element P2 is used for the second detector 18 in this embodiment and thereby it is possible to detect the occurrence of the lock current securely. Therefore, it is possible to solve the problem that the lock current is not detected even though it is actually flowing and the opposite malfunction that the circuit is falsely shut off detecting the lock current though the operating current is flowing. In this connection the voltage imposed on the base of the transistor Q2 can be set according to the divided voltage ratio of the resistors R4 and R6.

The present invention according to the third embodiment will be described referring to FIG. 4.

Figure 4:
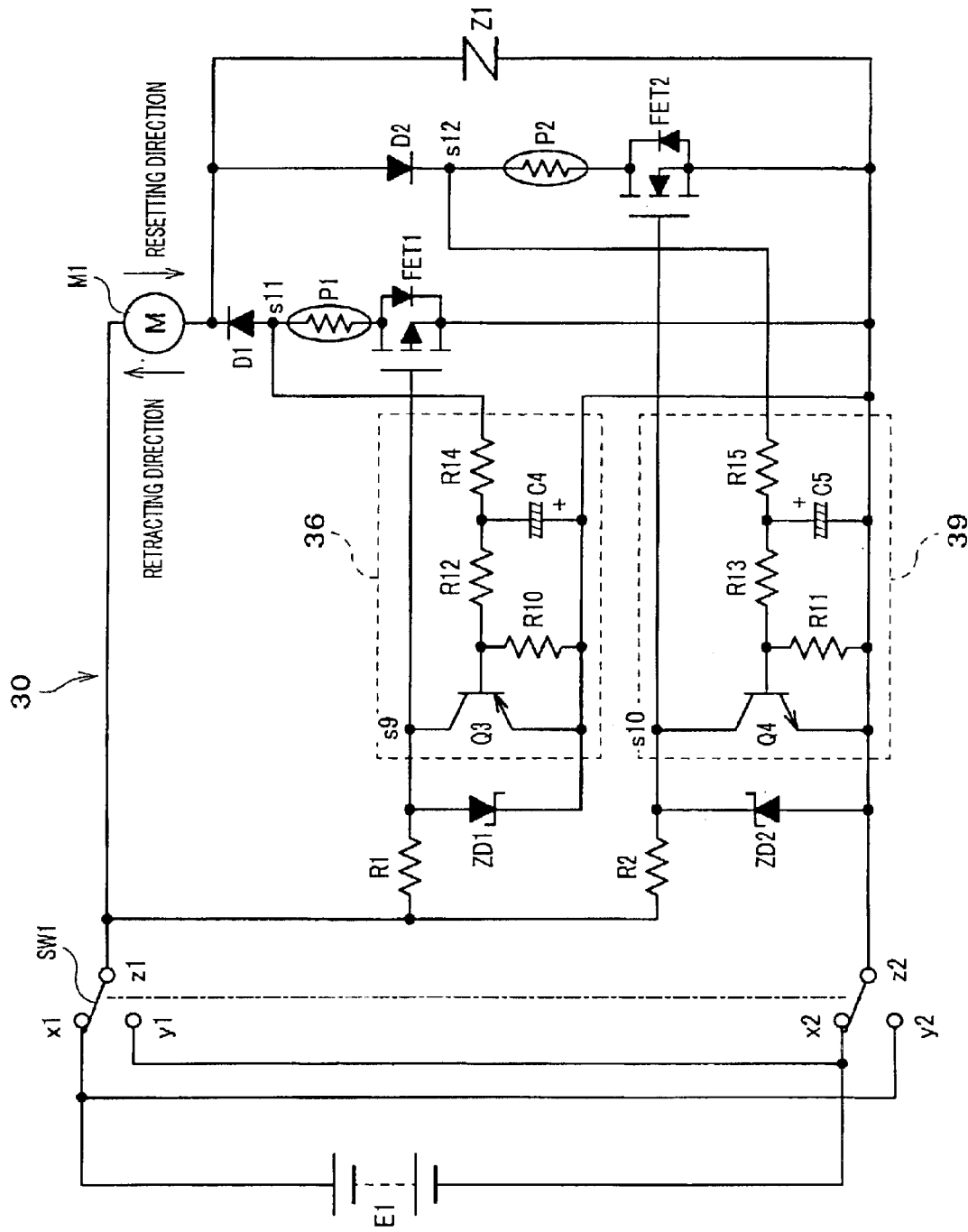
FIG. 4 is a circuit diagram showing the control unit for an electrically retractable door mirror according to the third embodiment of the present invention.
Figure 5:
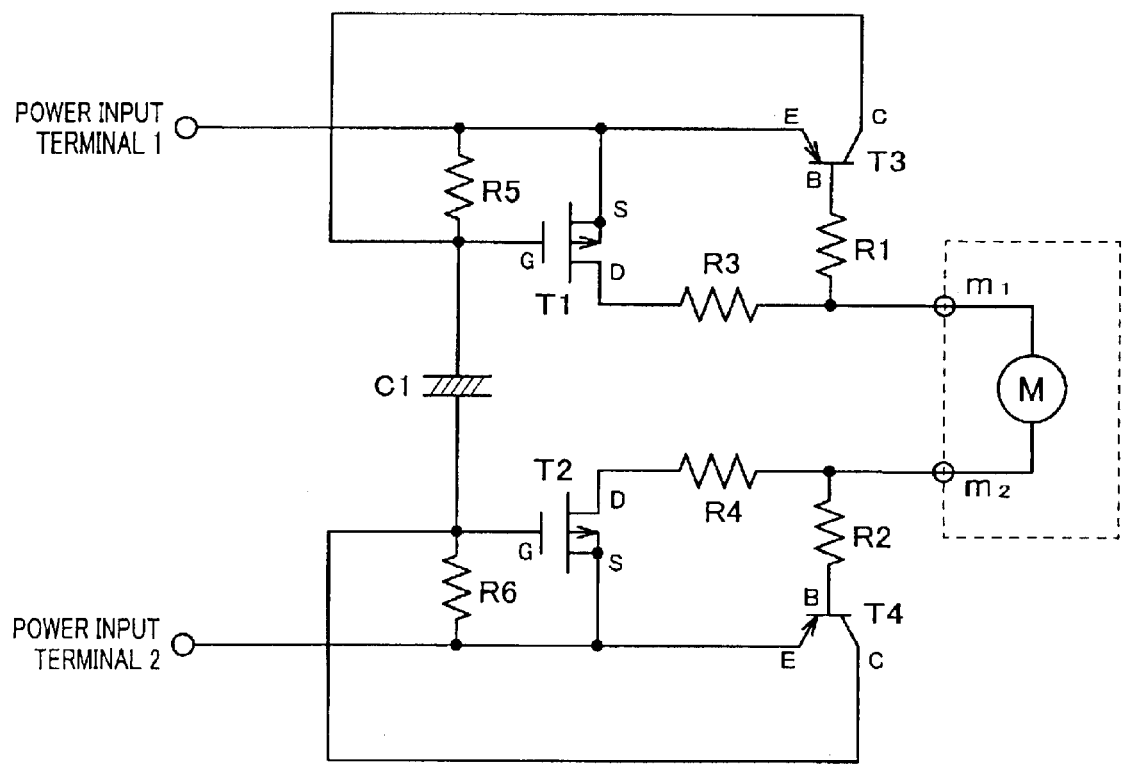
FIG. 5 is a circuit diagram showing the structure of the control unit for an electrically retractable door mirror according to the prior art.

FIG. 4 is a circuit diagram showing the control unit for an electrically retractable door mirror according to the third embodiment of the present invention. A control unit for an electrically retractable door mirror 30 according to the present embodiment employs PTCs P1 and P2, the same as the second embodiment, replacing the resistors R7 and R8 used for the first and second detectors 15 and 17 of the first embodiment. Also it further replaces the first and second shutoff SWs 16 and 19 with a first and second shutoff SWs 36 and 39. Taking into account the similarities, further descriptions will be omitted for the items which are the same as those of the first and second embodiments, bearing the same symbols.

As shown in FIG. 4, the first shutoff SW 36 includes a PNP transistor Q3, a capacitor C4 for absorbing the motor noise and resistors R10, R12 and R14. The collector of the transistor Q3 is connected to the gate of the FET1 through a junction s9, the emitter to the contact z2 of the change-over switch SW1 and the base to the junction s11 of the diode D1 and the PTC P1 through the resistors R12 and R14. Also the resistor R10 is connected between the base of the transistor Q3 and the contact z2 of the change-over switch SW1, and the capacitor C4 is connected between the junction of the resistors R12 and R14 and the contact z2, respectively.

Similarly, the second shutoff SW 39 includes a NPN transistor Q4, a capacitor C5 for absorbing the motor noise and resistors R11, R13 and R15. The collector of the transistor Q4 is connected to the gate of the FET2 through a junction s10, the emitter to the contact z2 of the change-over switch SW1 and the base to the junction s12 of the diode D2 and the PTC P2 through the resistors R13 and R15. Also the resistor R11 is connected between the base of the transistor Q4 and the contact z2 of the change-over switch SW1, and the capacitor C5 is connected between the junction of the resistors R13 and R15 and the contact z2, respectively.

The operation of the control unit according to the present embodiment will be described below, assuming that the door mirror is reset to the normal position from the stored position (the door mirror is retracted). The change-over switch SW1 is accordingly selected, so that the connection is established between the contacts x1 and z1, and x2 and z2.

Then the FET2 is turned on since the source voltage of the battery E1 is imposed on the gate of the FET2.

The current flows through the loop—battery E1, contact x1, contact z1, motor M1, diode D2, PTC element P2, FET2, contact z2 and contact x2, thereby driving rotationally the motor M1 in the resetting direction. The door mirror (not shown) thus returns to the normal position rotationally.

When the door mirror reaches the normal position and the rotation of the motor M1 is forcefully terminated, the voltage at the junction s12 increases depending on the resistance increase of the PTC element P2 due to the lock current of the control unit 30. Since this voltage is divided by the series connection of the resistors R13 and R15 and the resistor R11 and imposed on the base and emitter of the transistor Q4, the continuity between the collector and emitter of the transistor Q4 is established to turn off the FET2 when the divided voltages exceed predetermined levels. The current flowing into the motor M1 is thus shut off.

When the door mirror in the normal position is retracted, on the other hand, the change-over switch SW1 is selected so that the connection between the contacts y1 and z1, and y2 and z2 is established. Accordingly, the current flows through the motor M1 in the retracting direction shown in FIG. 4, rotating the motor M1 in the retracting direction the same way described above. The current is shut off when the door mirror reaches the stored position.

It is possible to rotate the motor M1 in the normal or reverse direction and shut off the current securely if the door mirror reaches the normal or stored position.

However, the transistor will possibly turn off since the base voltage drops lower than that required for turning it on, if a short break of the power source and the subsequent decrease in the electric charge stored by the capacitor occur in the circuit, which only replaces the resistors of the first and second detectors 15 and 18 shown in the first embodiment with the PTC elements P1 and P2. When the voltage is imposed on again, the circuit always performs the sequence—FET2 ON→lock current flowing→heat generation of PTC P2→detection, which leads to the increase of the ON/OFF number of the PTC, possibly causing damage to it.

In the present third embodiment, the second shutoff SW 39 is so arranged in order to prevent the damage that a resistor is added to the base of the transistor Q4 and the location of the capacitor C5 is modified. The capacitor C5 is charged with the higher potential than that of the base of the transistor Q4. Since the capacitor C5 supplies the base with the electric charge even if the drop of the base potential occurs due to a power source short break, it takes some time for the base of the transistor Q4 to drop from the turn-on to turn-off potential. If the voltage is imposed on the control unit 30 again, the FET2 will not be turned on since the base potential is maintained high enough to keep the transistor Q4 on as long as the short break doesn't last too long. It is possible to lessen the load imposed on the PTC P2 as it is prevented from working for a short break of very short duration.

It will now be appreciated from the foregoing description that the present invention is not limited to the particularly illustrated embodiment discussed above and may be carried out in various modified forms. It has been described that the resetting operation is performed with the connection of x and z of the switch and on the other hand the retracting operation is performed with the connection of y and z, which is for giving a clear understanding of the circuit operation. It is not limited to the direction shown in the figures but it is possible to reverse the direction thoroughly or partially, only one of the door mirrors.

The embodiment above described employs the PTC elements P1 and P2 for the first and second detectors 15 and 18, which can be replaced with other elements that are capable of changing the electrical resistance depending on the current variation.

The FET1 and FET2 are used for the first and second motor current SWs 14 and 17, and transistors Q1 and Q2 or Q3 and Q4 for the first and second shutoff SWs 16 and 19 or 36 and 39, respectively, which can be replaced with other elements having the same functions.

INDUSTRIAL APPLICABILITY

The control unit for an electrically retractable door mirror includes the first and second control circuits, each of which has an electronic switch that is capable of switching on/off depending on the polarity of an electrical signal switched by a change-over switch, an excess current detecting means whose electrical resistance grows with an increase in a current, and a shutoff switch which switches off the electronic switch when a voltage generated in the excess current detecting means exceeds a predetermined value. The invention enables the reliable detection of the excess current and the instantaneous shutoff of the current supplied to the motor.

The first and second excess current detecting means employ the PTC elements, allowing the reliable detection of the excess current and the instantaneous shutoff of the current supplied to the motor even if the operating current is somewhat large.

Since the timer is provided between the first and second power input terminals and the first and second control circuits, it is possible to shut off the current in a predetermined time and prevent the motor burnout when the lock current doesn't reach the detectable level defined in the circuit and the PTC or the FET is shorted.

Each of the first and second control circuits includes the transistor, resistors and capacitor. The collector of the transistor is connected to the first power input terminal, the emitter is connected to the second power terminal, and the base is connected to the motor through the first and second resistors and the diode and to the second power terminal through the third resistor. The capacitor is also connected between the junction of the first and second resistors and the second power input terminal. It is thereby possible to lessen the load imposed on the PTC since the turn-on potential of the transistor can be maintained as long as the short break of the power source doesn't last long even if it occurs.

The surge absorbing element is provided between the junction of the motor terminal and the first and second control circuits and the second power input terminal. It allows the application of semiconductors with low voltage resistance, thereby contributing to the reduction in the production cost.

What is claimed is:

1. A vehicle door mirror controlling apparatus comprising:
   a motor having first and second terminals and configured to move a door mirror from a normal position to a stored position and from the stored position to the normal position;
   a direct current power source configured to supply power to the first and second terminals of the motor;
   a first controlling element configured to control the motor to move the door mirror from the normal position to the stored position and comprising:
      a first current detector connected to the first terminal of the motor;
      a first switching element connected to the first current detector in series, the first switching element and the first current detector being provided between the first terminal of the motor and the direct current power source; and
      a first driver configured to open and close the first switching element according to a value detected by the first current detector; and
   a second controlling element configured to control the motor to move the door mirror from the stored position to the normal position and comprising:
      a second current detector connected to the first terminal of the motor;
      a second switching element connected to the second current detector in series, the second switching element and the second current detector being provided between the first terminal of the motor and the direct current power source; and
      a second driver configured to open and close the second switching element according to a value detected by the second current detector.

2. A vehicle door minor controlling apparatus according to claim 1, wherein the first and second current detectors comprise a positive temperature coefficient element.

3. A vehicle door mirror controlling apparatus according to claim 1, further comprising:
   a timer which is configured to turn off the first switching element when predetermined time has elapsed after the first switching element is turned on and which is configured to turn off the second switching element when predetermined time has elapsed after the second switching element is turned on.

4. A vehicle door mirror controlling apparatus according to claim 1, wherein each of the first and second drivers comprises,
   a transistor, a collector of the transistor being connected to a first power source terminal of the direct current power source, which is connected to the second terminal of the motor, an emitter of the transistor being connected to a second power source terminal of the direct current power source,
   first and second resistors through which a base of the transistor is connected to the first terminal of the motor,
   a third resistor through which the base of the transistor is connected to the second power source terminal of the direct current power source, and
   a capacitor provided between the second power source terminal of the direct current power source and a connection point between the first and second resistors.

5. A vehicle door mirror controlling apparatus according to claim 1, further comprising:
   a surge absorbing element provided in parallel with the first switching element and the second switching element.

* * * * *